United States Patent Office 3,734,717
Patented May 22, 1973

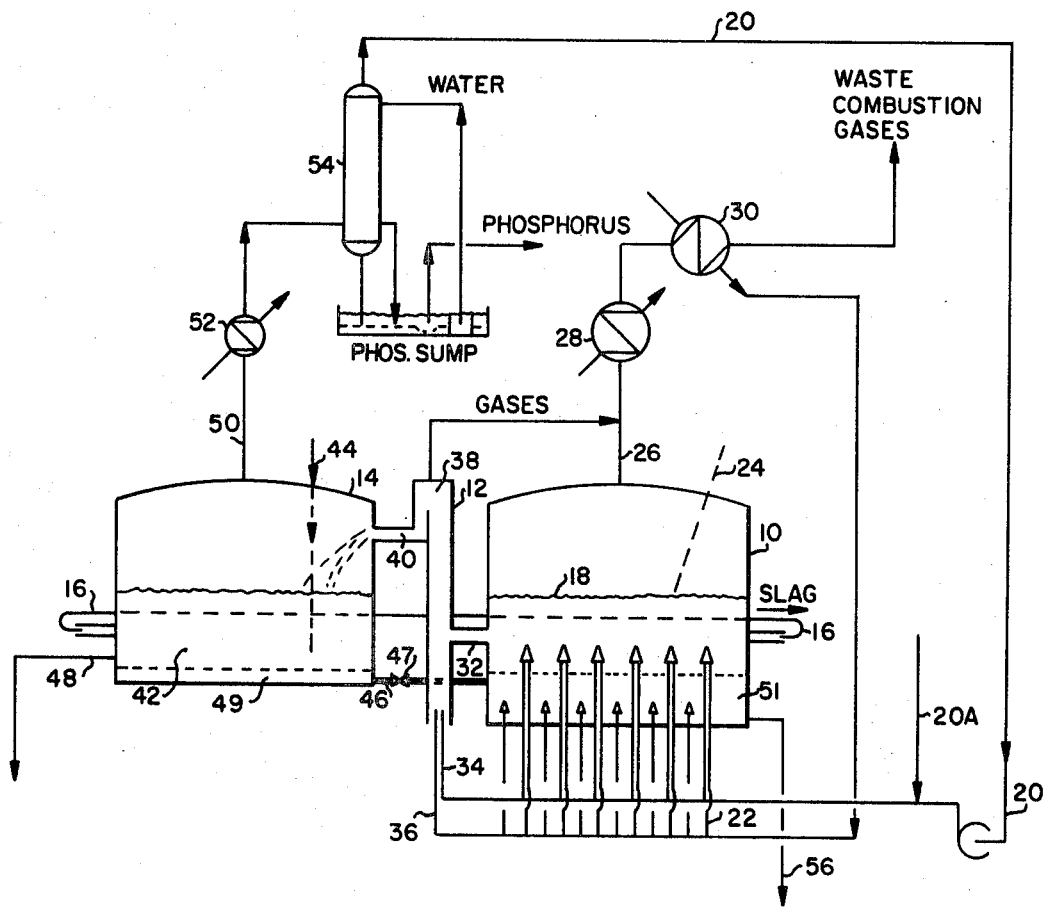

3,734,717
PRODUCTION OF PHOSPHORUS AND STEEL FROM IRON-CONTAINING PHOSPHATE ROCK
Leonard Seglin, New York, N.Y., and Charles A. Gray, Charleston, W. Va., assignors to FMC Corporation, New York, N.Y.
Filed Nov. 18, 1971, Ser. No. 200,154
Int. Cl. C21b *1/02, 13/14;* C01b *25/02*
U.S. Cl. 75—28                                        1 Claim

ABSTRACT OF THE DISCLOSURE

Phosphate rock, containing oxidized phosphorus and iron, is melted, together with recycle slag and a flux if necessary, in an oxidizing zone to a temperature substantially higher than that necessary for carbon to reduce the iron and phosphorus; compounds in the ore to their elements; the molten material is pumped into a separate reduction zone into which carbon is fed to reduce the iron and phosphorus compounds to their elements; the molten slag from the reduction, cooled substantially by the endothermic reaction, is then in part recirculated back to the oxidizing zone and in part removed from the process. The phosphorus produced is collected overhead from the reducing zone; the alloy of iron and phosphorus produced in the reduction is transferred to the oxidizing zone, where the phosphorus is preferentially oxidized, and steel is recovered from the bottom of the oxidizing zone.

BACKGROUND OF THE INVENTION

Field of the invention

This invention relates to the production of phosphorous and steel by reduction of phosphate rock containing both metals.

Prior art

The production of elements from oxidized ores by reduction with carbon is a most important one in our economy. The problem of reducing costs has attracted the attention of countless researchers.

Elemental phosphorus is produced commercially by the reduction of phosphate rock with coke in an electric furnace at about 1500° C. Relatively low grade phosphate rock containing approximately 25% $P_2O_5$ is used. Silica is added to adjust the silica-to-lime ratio to approximately unity. Coke is used as the reductant. The largest phosphorus furnaces in use today produce approximately 90 million pounds of phosphorus per year. Smooth operation of such large furnace requires extensive preparation of the burden before it is charged to the furnace. The rock is finely ground, briquetted, and calcined at high temperature over a gas flame. The rock briquettes (called nodules after calcining), coke and silica are charged to the top of the electric furnace.

Electric energy is supplied to the furnace through large graphite or carbon electrodes. About 6 kilowatt hours of electricity are required per pound of phosphorous produced. Approximately one-third of the current is required to heat and melt the charge. As components at the bottom of the furnace are melted, the bed moves slowly downward and the particles of coke, rock and silica are heated by the rising gases. A pool of slag is maintained in the bottom of the furnace at approximately 1500° C. (2670° F.). In or near this slag pool, reduction of the phosphate values in the rock occurs. The by-product slag tapped from the furnace contains approximately 2% residual $P_2O_5$.

The metal oxides originally present in the phosphate rock are reduced. Molten ferrophos, primarily iron saturated with elemental phosphorus, collects at the bottom of the furnace. This, too, is tapped periodically. The phosphorus leaves the furnace as a vapor at about 10 volume percent concentration in carbon monoxide. These off-gases are cooled and the phosphorus is condensed as a liquid. The carbon monoxide is then burned in the calciners.

There are several disadvantages in the present mode of operation. The preparation of the phosphate rock is an expensive operation. The direct downgrading of electrical energy to heat is a wasteful operation. The heat can be supplied more economically by the combustion of fossil fuels to carbon dioxide and water. In addition, the expensive graphite electrodes are gradually consumed during the operation. Moreover, ferrophos has only a limited market, and the production results in a lowering of the value of both the iron and phosphorus in the product.

British Pat. 1,084,317, publish Sept. 20, 1967 and issued to Albright & Wilson (MFG) Limited, shows a proposed process for the production of phosphorus, in which a body of molten slag is maintained in a vessel divided into two compartments by a partition wall which goes below the surface of the slag. Fuel is burned in one oxidizing compartment to heat the slag. Fresh ore and reductant are fed into the other compartment; convection or force circulation of heated slag from the oxidizing compartment heats the reducing compartment to the temperature necessary to melt the charge and supply the endothermic heat of reaction. A temperature of 1600° C. (2850° F.) in the melting-reducing compartment is said to be obtained by heating the oxidizing compartment to 1700° C. (3030° F.).

Attempts to work with the process of this British patent have indicated that the process has very low productivity unless there is intensive agitation of the slag in the reducing compartment. Such agitation results in transfer of substantial phosphorus values into the slag which must be tapped off periodically. Moreover, it is apparently necessary to work at the suggested temperature of 1600° C. in the reducing compartment—some 100° C. above that required in conventional electric furnaces—in order to get more than minimal productivity.

In our copending application Ser No. 108,347, entitled "Ore Reduction with Slag Heat Transfer" and filed Jan. 21, 1971, we describe a process which overcomes these difficulties. In the method of our copending application, we operate by continuously introduced ore, with or without flux, fuel and oxygen, into an oxidizing section containing a molten recycle pool to melt the ore and produce a melt with a temperature about 225 to 350° F. higher than required to reduce the phosphorus and iron in the ore with carbon, continuously propelling the melt to a physically separated reducing section, most preferably by heated gas lift, introducing carbon into the reducing section along with the melt, permitting the reduction to be carried out to produce phosphorus, molten slag and ferrophos continuously, returning a substantial portion of the slag to the oxidizing section to help melt the incoming ore and provide heat transfer essential for the process, removing the phosphorus overhead from the reducing section as required, and tapping off the ferrophos as it accumulates.

While that process overcomes many of the difficulties associated with the electric furnace and with the process of the British patent, it still produces ferrophos.

RELATED APPLICATIONS

This application is related to our copending application Ser. No. 108,347. filed Jan. 21, 1971, and to our application entitled "Steelmaking Process," filed simultaneously herewith.

OBJECTS OF THIS INVENTION

It is the principal object of the present invention to produce phosphorus and iron as separate materials in the reduction of phosphate rock containing both elements, while at the same time preserving the advantages obtained by the process of our copending application.

STATEMENT OF THE INVENTION

This object is obtained by continuously introducing phosphate rock, with or without flux, fuel and oxygen, into an oxidizing-melting section containing a molten recycle pool to melt the ore and produce a melt with a temperature about 225 to 350° F. higher than required to reduce the metals in the ore with carbon, continuously propelling the melt to a physically separated reducing section, most preferably by heated gas lift, introducing carbon into the reducing section along with the melt, permitting the reduction to be carried out to produce the metals and a molten slag continuously, returning a substantial portion of the slag to the oxidizing section to help melt the incoming ore and provide heat transfer essential for the process, removing phosphorus overhead from the reducing section, transferring ferrophos from the bottom of the reducing section to the bottom of the oxidizing-melting section, preferentially oxidizing the phosphorus in the ferrophos back into the molten slag-ore melt, and tapping steel of low phosphorus content from the bottom of the oxidizing-melting section.

THE DRAWING

The drawing is a schematic flow sheet of the process.

DETAILED DESCRIPTION OF THE INVENTION

In accordance with this invention, phosphate rock, containing calcium phosphate and combined iron, is fed into an oxidizing and melting section, where it mixes with recycle slag from a reducing section, and is melted and heated to a temperature sufficiently above that necessary to produce the iron and phosphorus by carbon reduction of the ore, so that the melt requires no added heat to complete the reduction reaction. Since the melted ore itself has a limited heat capacity, slag is mixed with it to provide adequate heat for the reduction. In general, the melt coming from the oxidizing section is about 125° C. (225° F.) hotter than reduction temperature for the process to work with reasonable recycle ratios. Optimum results are obtained at a differential of about 167° C. (300° F.). Where the differential exceeds about 193° C. (350° F.), heat losses become too great for optimum economy.

The oxidizing-melting section is heated with any desired fuel, in any known fashion, but preferably by submerged combustion beneath the molten slag pool. Carbon monoxide from the reducing section is preferably utilized, together with supplemental fuel which may be gas, cheap coal or other economical fuel source.

The required temperatures can be obtained by using air. Once the process is started, it is only necessary to replace heat used up in the reduction, plus that lost through the container walls and in sensible heat of off-gases and product, so that high-temperature oxygen flames are not necessary.

The oxidizing section is made of refractory material suitable for the materials being handled. They are preferably cooled, in known fashion, so that their inner surface will freeze an inner layer of slag to protect the refractory.

The reducing section should be physically separated from the oxidizing section, so that the high-temperature recycle melt goes into the reducing section free of oxidizing gases. Recycle heated slag and reductant are preferably charged into the reducing section from above onto the surface of the melt.

Mechanical transfer of the melt is possible, e.g. a series of ladles functioning as an elevator, but the maintenance problems inherent in any mechanical device operating at 1500° C. or so suggest the desirability of using some other approach. Magnetohydrodynamic pumps can be used where the melt has sufficient conductivity. The simplest and preferred means of transferring the hot melt is a gas lift. Most conveniently, the gas lift is fed by a mixture of carbon monoxide from the reducing section and air preheated by the waste gases, the partial combustion of the carbon monoxide producing sufficient heat to get the gas lift up to the melt temperature and thus prevent cooling of the melt during transfer. The lift is simple, has no mechanism exposed to melt temperatures, and delivers the melt at the desired temperature to the reducing section.

The reducing section offers no problems of construction which differ from conventional practice, being less destructive of refractories because of the total absence of exotherms in the system. In this section, carbon reductant, generally suspended in carbon monoxide, or less desirably in an inert gas like nitrogen, is fed onto the surface of the melt in the section along with superheated slag from the gas lift, and is internally mixed with it. The reaction is essentially liquid completely surrounding solid. As the reaction progresses, the ferrophos sinks to the bottom of the melt and the phosphorus evaporates and is drawn off as vapor. The slag is maintained at the desired level by recycling the necessary amount to the oxidizing-melting section, and removing an amount corresponding to new slag being formed from the new ore plus flux being added.

Obviously, the process must be run continuously, on economic considerations. It can be started up in the oxidizing section with ore and flux, but is most conveniently started up after shutdown by melting old slag from the slag heap.

The ferrophos produced is tapped into the oxidizing section as desired, where it is subjected to the action of oxygen, which preferentially burns the phosphorus, the oxide being absorbed into the slag-ore melt. The iron is tapped off when the level of phosphorous is sufficiently low. This portion of the process can be run batchwise simply by closing a valve between the two sections.

The drawing illustrates how the process may be carried out. An oxidizing-melting section 10, a transfer device 12, a reducing section 14, a slag recycle line 16 and a ferrophos transfer line 46 are the fundamental units used in the process. A body of melt 18, largely recycle slag, is maintained in the oxidizing-melting section 10; it is heated by fuel from line 20 and by supplemental fuel from line 20a which is burned with air from line 22, preferably by submerged combustion in the melt 18.

Phosphate rock and flux are fed into the melt 18 through line 24, and are merged into the melt body 18. Combustion gases exit via lines 26, and are utilized to generate steam in a waste-heat boiler 28 and preheat air for the combustion in a heat exchanger 30 before being exhausted into the stacks. If necessary, cyclones and/or dust precipitators may be installed in the exhaust-gas line.

Near the bottom of the oxidizing-melting section 10 is a line 32 through which superheated melt 18 feeds into the gas lift 12. The melt 18 is lifted by a stream of hot gas formed by burning carbon monoxide, in line 34, with preheated air in line 36, in order to provide sufficient heat whereby gas lift 12 does not chill the melt 18. In the top 38 of the gas lift 12, the slag and gas are separated, the slag discharging through pipe 40 into the reducing section 14, the gases joining the exhaust gases from the oxidizing-melting section 10.

The stream of melt 18 discharges into the top of the reducing melt 42 in the reducing section 14. As it discharges, it mixes with a stream of reducing agent 44, mostly finely divided carbon carried in carbon monoxide or, less preferably, in an inert gas like nitrogen. Since the temperature is sufficiently high, reduction takes place rapidly, with absorption of the endothermic heat of reaction, and phosphorus and iron are formed, along with more slag and carbon monoxide. The iron alloyed with phosphorus as ferrophos is tapped off through a line 46 at the bottom of section 14 for return to the oxidizing section 10; sufficient slag to maintain the melt 18 at the desired level is likewise tapped off through line 48, and the remaining slag recirculates by gravity to the oxidizing-melting section 10 through slag recycle line 16.

The phosphorus, mixed with carbon monoxide, goes overhead through line 50 through a waste-heat boiler 52, a phosphorus condenser system 54 where the phosphorus product is collected; the carbon monoxide goes back into line 20, and is used to produce heat in the process.

The ferrophos 49 in the bottom of the reducing section 14 is tapped through ferrophos transfer line 46 into a pool 51 of ferrophos in the bottom of the oxidizing-melting section 10, which is deeper than pool 49. A valve 47 is provided so that flow can be cut off, and pool 51 can be oxidized to a low phosphorus level. At the same time, the carbon level is reduced, so that the molten metal in pool 51, when it is tapped off through line 56, is actually steel rather than iron. The valve 47 is then reopened; the accumulated ferrophos in pool 49 is allowed to reform pool 51, and the process is repeated.

The walls of the various sections may be water-cooled in known fashion, if desired, to maintain a layer of solidified slag to protect the refractory linings of the vessel; this is an expedient well known in the art.

As distinguished from most prior-art processes where the reaction occurs at a surface, the principal reactions here are in the body of the melt, so that relative heat losses which are surface-related are reduced as the process is scaled up.

There are numerous alternates in operation of the process. Thus, the sizing of the ore and reductant can range from powder to briquettes. The reductant can be coal, or a coal char, or some other form of carbon such as petroleum coke; the reaction time varies with the nature of the reductant and is shortest with coal and low-temperature chars.

Since the ore is melted in the oxidizing section, it is preferred that it be powdered, to reduce melt time; however, porous briquettes melt readily and the oxidizing section can be, sized to take care of ores of various sizes.

The reductant can, if powered or of medium size, be injected into the recycle slag stream, at the surface of the slag as shown in the drawing, below the slag, and even below the metal; when briquettes are used, they are floated on the slag surface and are wet by splashing slag and by partial submergence in the slag.

In a typical installation for producing 25,000 pounds of phosphorus per hour from an ore containing 24% $P_2O_5$ and 2.0% $Fe_2O_3$, the following amounts of materials are used, at the indicated rates and temperatures:

| | Stream number | Thousands of pounds per hour | Temperature, °F. |
|---|---|---|---|
| Ore plus silica to oxidizing-melting section | 24 | 283 | 70 |
| Char to reducing section | 44 | 17.3 | 70 |
| Supplemental fuel (coal) to oxidizing-melting section | 20 | 97.8 | 70 |
| Slag to gas lift | 40 | 2,817 | 3,000 |
| Slag to oxidizing-melting section | 16 | 2,561 | 2,700 |
| Ferrophos to converter | 46 | 3.9 | 2,700 |
| Air to converter | 51 | 7.6 | 1,000 |
| Air to oxidizing-melting section | 36 | 1,200 | 1,000 |
| And would produce: | | | |
| Phosphorus product | 54 | 25 | 140 |
| Steel by-product | 52 | 2.7 | 3,000 |
| Slag to waste | 48 | 202 | 2,700 |
| Carbon monoxide to oxidizing-melting section (dry) | 50 | 65.7 | 140 |
| Wast gas to heat recovery and stacks | 26 | 1,304 | 1,000 |

Obviously, the example can be multiplied indefinitely, without departing from the scope of the invention as defined in the claim.

We claim:

1. The method of producing pohsphorus and steel from an ore containing phosphorus and iron in oxidized form reducible with carbon which comprises (1) continuously introducing ore, fuel and oxygen into an oxidizing-melting section containing a molten pool of recycle slag to melt the ore into the slag and heat the slag to a temperature at least 225° F. higher than the operating temperature of a second physically separated reducing section; (2) continuously propelling the melt into the reducing section; (3) continuously adding carbon to the reducing section to react with the ore to produce gaseous phosphorus, molten ferrophos and molten slag; (4) recycling a sufficient portion of the slag to the oxidizing-melting section to maintain the desired amount of slag in the process; (5) removing slag from the process; (6) recovering phosphorus from the overhead; (7) transferring the molten ferrophos to the bottom of the oxidizing-melting section below the slag; (8) treating the molten ferrophos with oxygen to oxidize most of the phosphorus and carbon therein to the level of steel; and (9) recovering the so-produced steel.

References Cited
UNITED STATES PATENTS

| | | | |
|---|---|---|---|
| 1,028,070 | 5/1912 | Hiorth | 23—223 X |
| 1,156,775 | 10/1915 | Haas | 75—40 |
| 1,274,479 | 8/1918 | Wenman | 23—223 |
| 1,313,274 | 8/1919 | De Barros | 75—92 |
| 2,117,301 | 5/1938 | Curtis et al. | 23—223 |
| 2,150,261 | 3/1939 | Blackwell et al. | 423—322 X |
| 2,517,557 | 8/1950 | Graham | 75—43 X |
| 2,526,473 | 10/1950 | Gilliland | 75—43 |
| 2,557,650 | 6/1951 | Gilliland | 75—40 |
| 2,581,597 | 1/1952 | Nissim | 75—40 X |
| 2,612,444 | 9/1952 | Rummel | 75—40 |

FOREIGN PATENTS

| | | | |
|---|---|---|---|
| 1,084,317 | 9/1967 | Great Britain | 23—223 |
| 1,094,918 | 12/1967 | Great Britain | 23—223 |
| 318,677 | 12/1969 | Sweden | 75—40 |

HENRY W. TARRING II, Primary Examiner

U.S. Cl. X.R.

75—40, 46, 60, 132; 423—322, 299